June 6, 1933.    J. G. CAPSTAFF    1,912,758
SOUND AND PICTURE RECORD FILM
Filed Aug. 30, 1929
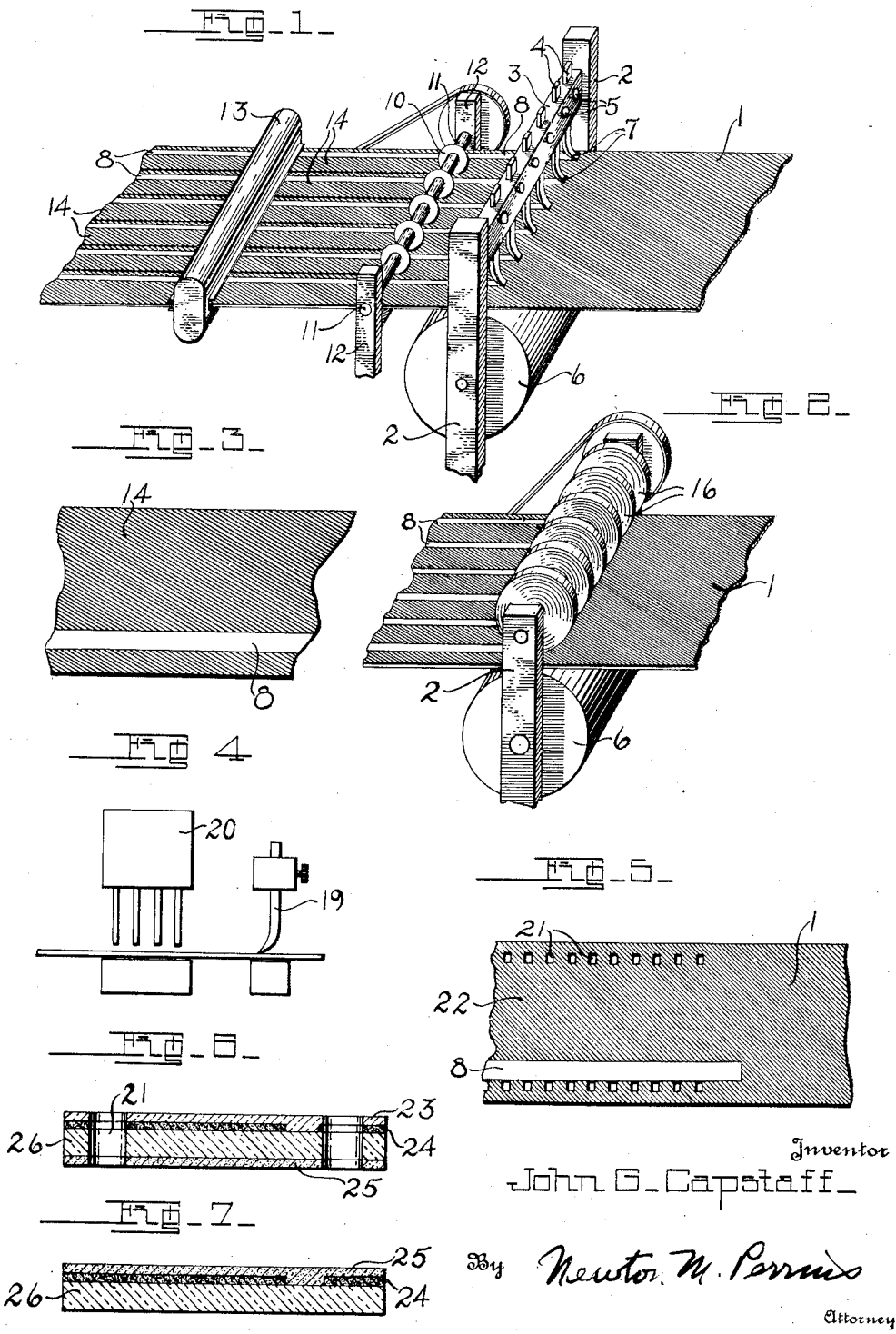
Inventor
John G. Capstaff
By Newton N. Perrins
Attorney Patented June 6, 1933

1,912,758

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

SOUND AND PICTURE RECORD FILM

Application filed August 30, 1929. Serial No. 389,491.

This invention relates to film to be used for the projection of motion pictures in color and for the reproduction of sound. Several methods have been proposed for the formation of a motion picture film having a uniformly colored picture area and an untinted sound record area. These methods call for considerable delicacy in manufacture, and are, in general, applicable to film only after it has been slit into the narrow widths needed for motion picture use.

My invention involves the tinting uniformly of a strip of film of the width at which it comes from the film forming wheels and before it is slit into the narrow widths. There is thus formed upon one surface of the film a uniform tint, and the reverse surface is coated with emulsion.

Either before or after the emulsion coating is applied, the film is passed through an apparatus which scrapes or grinds the color from narrow strips which are afterwards used as sound record areas. This operation may also be performed after the film has been slit into narrow widths and particularly may be done at the time of perforation and in the same machine.

Reference will now be made to the accompanying drawing, in the several figures of which the same reference characters indicate the same parts, and in which:

Figure 1 is a perspective view of a machine used in carrying out my invention.

Figure 2 is a perspective view of a different machine for carrying out my invention in another way.

Figure 3 shows a section of unperforated film embodying my invention.

Figure 4 shows a combined perforator and scraper upon which my invention may be practiced.

Figure 5 shows a strip of film embodying my invention, Figure 6 is a section of the film shown in Figure 5, and Figure 7 is a section of film disclosing another embodiment of my invention.

The film support used for photographic purposes is made in rather wide bands and customarily these are sensitized and then slit into narrow bands for use in motion picture purposes and other photographic uses. This film is coated upon one surface uniformly with a dye giving a uniform tint to that surface of the film. This is a permanent color or tint which is not materially or noticeably affected by the photographic processes and baths. This comprises a dye in a solvent which penetrates the material of the film support to an extent greater than does the ordinary photographic bath to which the support is practically impervious. It incorporates in and on one surface of the film a dye layer, which is permanent for all photographic and motion picture purposes. The extent to which it penetrates the film is, when measured, slight, being usually not over .001 inch, but is sufficient for the purpose outlined. I take such a wide band, 1, as shown in Figure 1, in the width at which it is manufactured and, before it is coated with a sensitized emulsion, pass it with the dyed surface uppermost through a scraping device of the type shown. This consists of two upright end supports 2, connected by a cross support 3, through which pass vertically a series of scrapers 4, held in adjusted positions by thumb screws 5. Beneath these scrapers is a large roll 6 and the film 1 passes over this roll and beneath the cutting ends 7 of the scrapers. In the illustrations only a few scrapers are shown, but in practice there would be a much larger number.

After the film has passed the cutting edges 7 it will be uniformly colored except for the scraped portions which will extend as clear strips 8. The knives will be so adjusted that they will remove just enough of the surface of the film to give a clear track. The film then passes beneath cutting disks 10 mounted on a common driving shaft 11 supported in posts 12. These slit the film into the desired widths and the resulting narrow bands 14 then pass beneath the suction squeegee 13, by which the loose particles formed in the scraping and slitting operations are removed.

The film is now in the form of a series of narrow bands 14, each having a clear track 8 upon it. These bands are separately wound up, this not being shown in the drawing.

A second method of removing the dye may be performed on the apparatus shown in Figure 2, which is the same in every respect as that shown in Figure 1, except that in place of the fixed cutting knives 4, there are a series of grinding rollers 16 which rotate and grind away a very slight portion of the dyed surface of the film, leaving the clear sound track as before.

There is shown in Figure 3 a small section of one of the narrow bands 14 in the form in which it leaves the apparatus shown in Figures 1 or 2. If desired, the film may be slit in the usual way without the formation of the clear areas at the time of slitting. The uniformly tinted band thus produced may be passed through an apparatus indicated diagrammatically in Figure 4, in which 20 is a perforating head forming the usual perforations 21 found upon motion picture film. After the film has passed the perforator it passes beneath a scraping knife 19 which performs the same operation as one of the knives 4 shown in Figure 1. The film, after leaving the perforator, is of the type shown in Figure 5, having the clear sound track 8 and the uniformly tinted picture area 22.

It is to be understood that the sensitive emulsion is applied to the surface of the film at any appropriate stage in manufacture. If the clear area is formed before the film is sensitized, this sensitive layer 25 may be applied over the dye layer 24 on support 26 as shown in Figure 7 or it may be applied on the opposite surface as indicated in Figure 6. The extent of the cut and the thickness of the dye layer are much exaggerated in Figures 6 and 7. Preferably a protective varnish layer 23 is applied over the dye layer 24 as shown in Figure 6.

Having thus described my invention, what I claim as new and desire to secure by Letters Patent is:

In the manufacture of film useful for the simultaneous reproduction of motion pictures in a single color and of sound, the steps of applying to one surface of a film support a dye solution capable of penetrating and permanently coloring the surface of the support and then removing the material of the support to the depth penetrated by the dye solution along an extended area thereby forming a recessed clear area for use as a sound track area and then filling said recessed area with a protective varnish.

Signed at Rochester, New York, this 27th day of August 1929.

JOHN G. CAPSTAFF.